United States Patent [19]

Hadaway

[11] Patent Number: 4,762,214
[45] Date of Patent: Aug. 9, 1988

[54] CLUTCH PLATE AND METHOD OF MAKING SAME

[75] Inventor: Bernard M. Hadaway, Highett, Australia

[73] Assignee: Repco Limited, Australia

[21] Appl. No.: 81,635

[22] Filed: Aug. 3, 1987

Related U.S. Application Data

[63] Continuation of Ser. No. 788,564, Oct. 17, 1985.

[30] Foreign Application Priority Data

Oct. 26, 1984 [AU] Australia ............................ PG7853

[51] Int. Cl.⁴ .............................................. F16D 13/68
[52] U.S. Cl. ............................ 192/107 C; 192/107 M
[58] Field of Search .......... 192/107 C, 107 M, 107 R, 192/107 T, 70.13; 188/250 G; 29/509, 522 A

[56] References Cited

U.S. PATENT DOCUMENTS

| | | | |
|---|---|---|---|
| 2,630,199 | 3/1953 | Gamble | 192/107 C |
| 2,812,842 | 11/1957 | Thelander | 192/107 C |
| 3,913,716 | 10/1975 | Sedlock | 192/107 R |
| 3,986,585 | 10/1976 | Toplis et al. | 188/250 G |
| 4,000,792 | 1/1977 | Guldin | 188/250 G |

FOREIGN PATENT DOCUMENTS

| | | | |
|---|---|---|---|
| 2447342 | 4/1975 | Fed. Rep. of Germany ... | 192/107 C |
| 779669 | 4/1935 | France ........................... | 192/107 C |
| 1095076 | 5/1955 | France ........................... | 192/107 C |
| 1340988 | 9/1963 | France ........................... | 188/250 G |
| 1303234 | 1/1973 | United Kingdom . | |
| 2012647 | 8/1979 | United Kingdom . | |
| 2044864 | 10/1980 | United Kingdom ........... | 192/107 C |
| 2103311 | 2/1983 | United Kingdom ........... | 192/107 C |

Primary Examiner—Rodney H. Bonck
Assistant Examiner—David A. Testardi
Attorney, Agent, or Firm—Stevens, Davis, Miller & Mosher

[57] ABSTRACT

A friction component for a clutch or brake including a facing of friction material and at least one metal section of plate-like form embedded in a rear surface of that facing and having an integral rivet or other fastener projecting outwardly from the facing rear surface. The metal section extends across a relatively small part of the facing rear surface and if there is a plurality of such sections they may be interconnected through integral bands. In the case of an annular friction component the metal sections are spaced circumferentially around the friction facing and if connecting bands are used they are preferably adjacent the inner periphery of the facing.

15 Claims, 4 Drawing Sheets

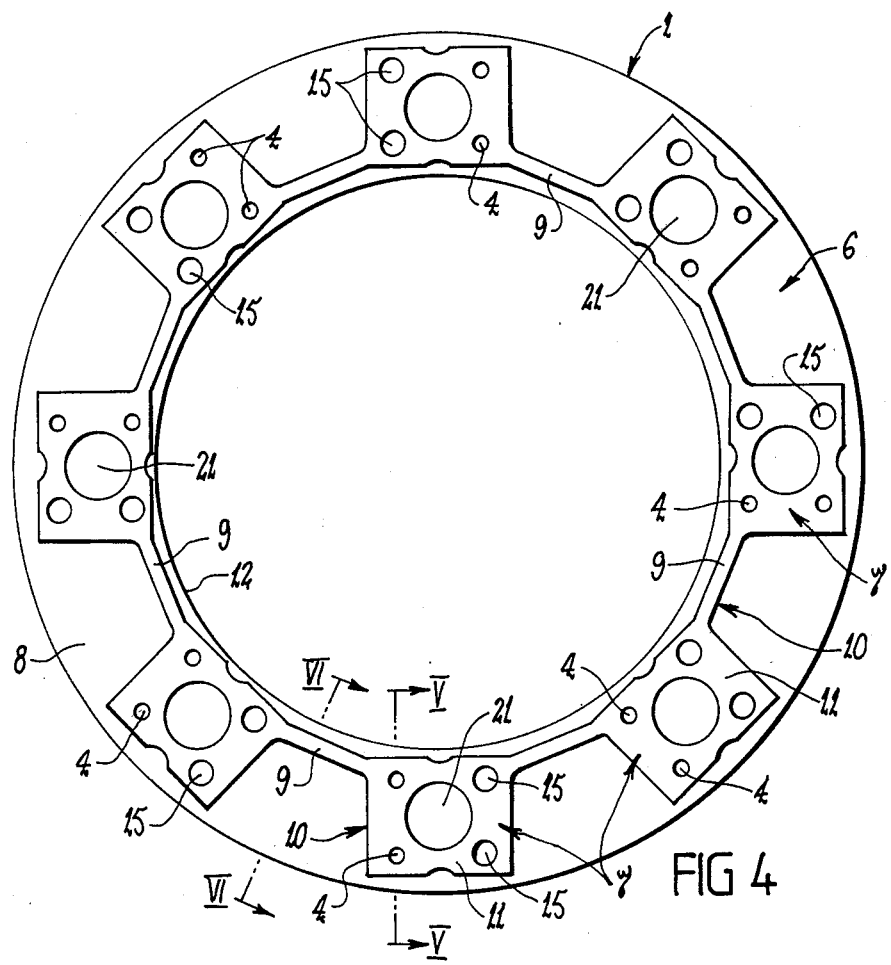
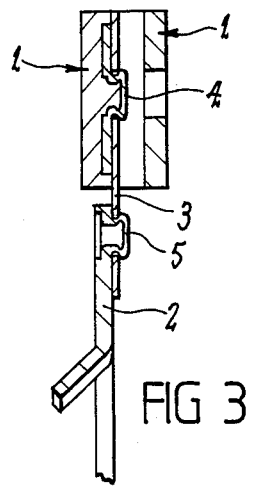
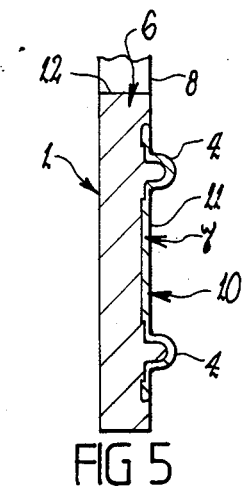
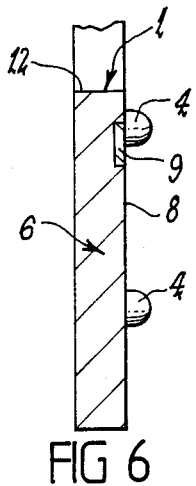
FIG 4
FIG 3
FIG 5
FIG 6

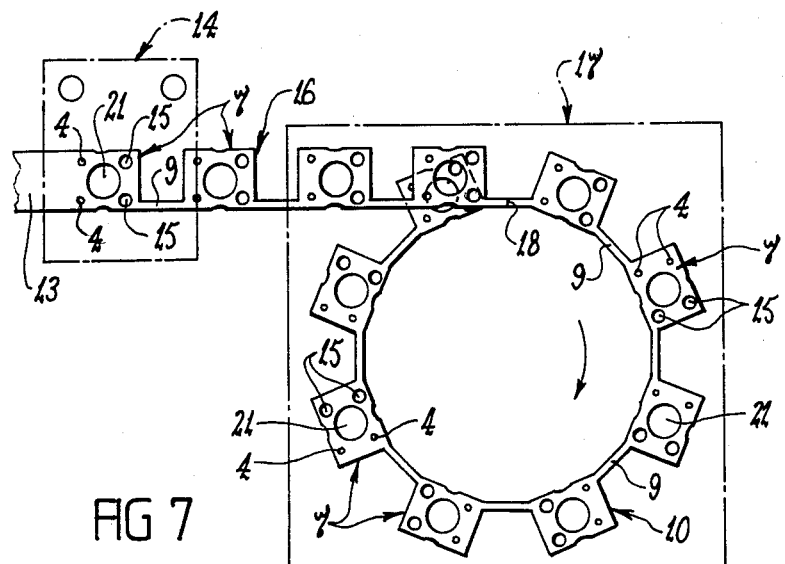
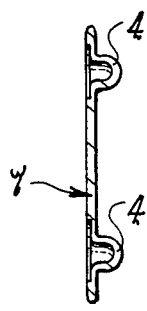
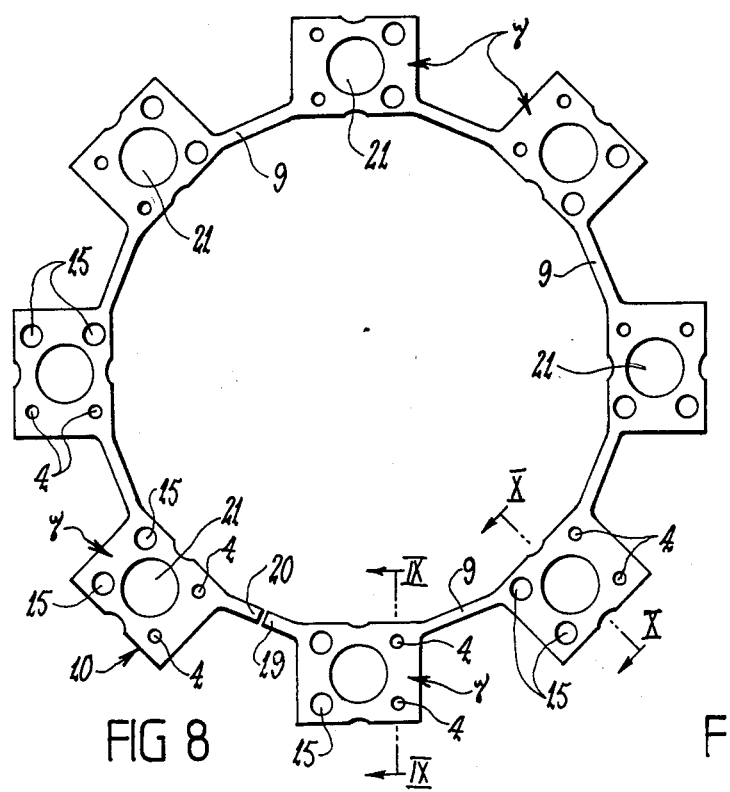
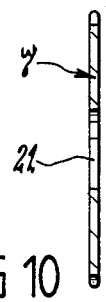
FIG 7
FIG 9
FIG 8
FIG 10

CLUTCH PLATE AND METHOD OF MAKING SAME

This is a continuation of application Ser. No. 788,564, filed Oct. 17, 1985.

This invention is concerned with friction components as used in brakes and clutches. The invention has particular application to clutch plates such as those used in the drive transmission systems of motor vehicles, and it will be convenient to hereinafter describe the invention with particular reference to such vehicle clutch plates. It is to be understood however, that the invention is applicable to clutch plates intended for other uses, and is also applicable to brakes of various kinds.

A typical vehicle clutch plate includes a central inner section which carries a splined hub by which a drive connection is made with a vehicle tail shaft, and an annular outer section which is connected to and rotates with the inner section. The outer section has friction facing on each of two opposite sides and is clamped between a pressure plate and a flywheel, for example, when the clutch is engaged to transmit drive from the flywheel to the gear-box and tail shaft. It is usual to form each of the aforementioned sections of two plate-like parts which are connected together in face to face relationship. The splined hub and inner section are usually interconnected through torsional damping springs in a manner such that the hub and inner section are capable of limited rotation relative to one another.

The friction component for such a clutch plate is generally of annular form and is secured in place by means of separately formed rivets which are counter-sunk below the surface of the facing. It follows that the only usable part of the facing is that part which exists above the heads of the counter-sunk rivets.

One problem with such prior constructions is that the usable part of the friction facing is limited by the instrusion of the rivets into the facing. Another problem is that setting of the several individual rivets is an inconvenient and time consuming task.

It is an object of the present invention to provide an improved friction component, and particularly such a component which is convenient to assemble with other components. It is another object of the invention to provide a friction component having fastening means secured to a rear surface thereof in such a way as to require minimum intrusion into the body of the friction facing. It is a further object of the invention in a particular form to provide an improved clutch plate including such a friction component.

The invention will be hereinafter described with reference to a clutch plate of the general form described above in which each of the clutch plate sections is formed of two parts. Furthermore, the inner and outer sections may be secured together by means of rivets formed in accordance with the method described in Australian Provisional Patent Application PG 7593 filed Oct. 11, 1984 (and its corresponding U.S. application Ser. No. 06/785,610, filed Oct. 8, 1985), and the disclosure of that application is to be read into the present specification by cross-reference. Each part of the annular outer section of the clutch plate will be hereinafter called a friction component and the part of the inner section which carries the cushion segments will be called the main plate.

In accordance with the present invention there is provided a friction component including, a facing of friction material and at least one plate-like section embedded in and secured to a rear surface of said facing, said section having formed thereon at least one integral fastener which projects outwardly therefrom away from said rear surface.

It is preferred that the plate-like section is made of sheet metal, but a non-metallic material such as a sufficiently strong plastics material could be satisfactory. When applied to clutch plates the friction component will usually be of annular form. In particular, the friction facing will be in the form of an annular section and there will be a plurality of metal sections embedded in the rear surface of that friction facing in circumferentially spaced relationship. Preferably, adjacent metal sections are interconnected through narrow integral bands of metal, each of which is located adjacent the inner periphery of the annulus. It is further preferred that each of those bands is substantially straight so as to extend generally in the direction of a tangent to that inner periphery rather than following the curvature of the inner periphery.

The essential features of the invention, and further optional features, are described in detail in the following passages of the specification which refer to the accompanying drawings. The drawings however, are merely illustrative of how the invention might be put into effect, so that the specific form and arrangement of the features (whether they be essential or optional features) is not to be understood as limiting on the invention.

In the drawings:

FIG. 3 is a cross sectional view taken along line III—III of FIG. 1;

FIG. 4 is an elevational view of an example friction component according to one embodiment of the invention;

FIG. 5 is an enlarged cross sectional view taken along line V—V of FIG. 4;

FIG. 6 is an enlarged cross sectional view taken along line VI—VI of FIG. 4;

FIG. 7 is a diagrammatic view of one form of method for producing part of a friction component in accordance with the present invention;

FIG. 8 is a view of the friction component part as manufactured in accordance with the method of FIG. 7;

FIG. 9 is an enlarged cross sectional view taken along line IX—IX of FIG. 8;

FIG. 10 is an enlarged cross sectional view taken along line X—X of FIG. 8;

Figure 1:
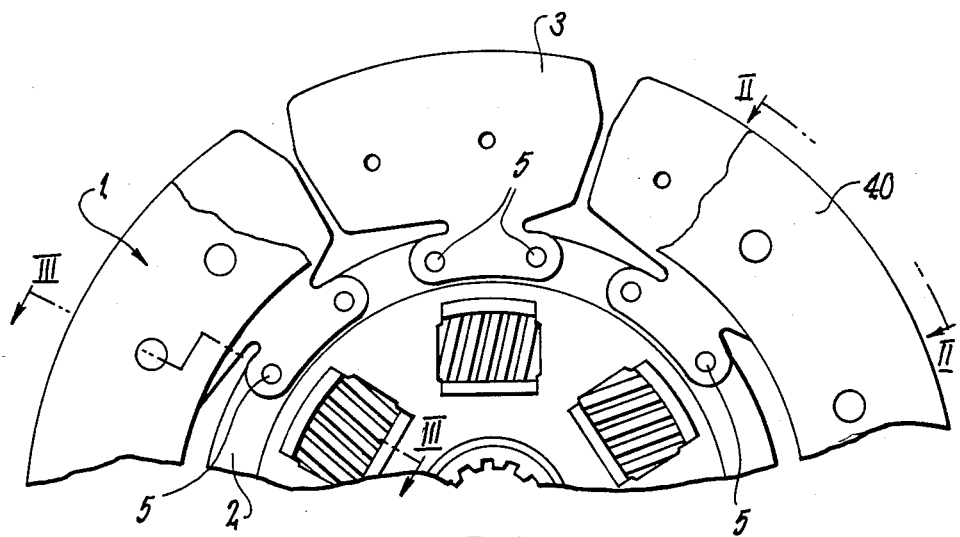
FIG. 1 is an elevational view of a typical form of clutch plate to which an embodiment of the invention is applicable, in which parts have been removed for convenience of illustration.
Figure 2:
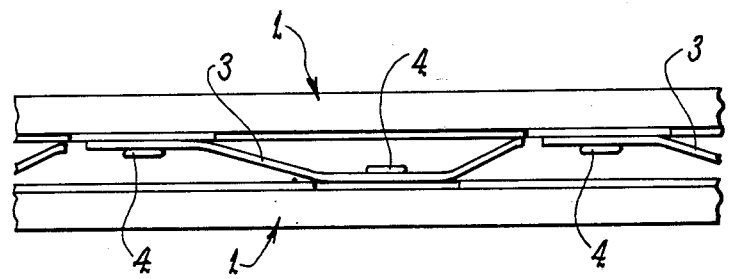
FIG. 2 is a view taken along line II—II of FIG. 1.

A typical clutch plate to which the invention is applicable is shown in part in FIG. 1, and in that construction each friction component 1 is connected to the main plate 2 through a plurality of separate cushion segments 3 which are plate-like and are formed of spring steel or the like. Each segment 3 is formed so as to function as a resilient spacer, whereby the two annular friction components 1 are supported in axially spaced relationship as shown in FIG. 2, but can be moved towards one another as a consequence of flexing of the segments 3. The cushion segments 3 are of known form and consequently need not be described in further detail.

In the particular arrangement shown, each cushion segment 3 is secured to each of the two friction components 1 by means of rivets 4 (FIG. 2). For that purpose, each friction component 1 may be provided with a series of integral rivets 4 and those rivets 4 may be formed in the manner described in co-pending application Ser. No. 06/785,610, or they may be formed in any other appropriate manner. Furthermore, the rivets 4 may be provided in a single row as shown in FIG. 1, or there may be two or more rows of such rivets 4.

Integral rivets 5, preferably of the foregoing kind, may be also formed on the main plate 2 of the clutch plate assembly and those rivets 5 can be arranged in spaced relationship around a pitch circle which is concentric with the clutch plate axis. As shown in FIG. 1, the rivets 5 are usually arranged in pairs, and the rivets 5 of each pair are spaced circumferentially around the same pitch circle. The rivets 5 of each pair are used to secure a respective cushion segment 3 to the main plate 2.

Any suitable method may be adopted to set the rivets 4 and 5 and thereby secure the various components in assembly.

In the construction shown, each friction component 1 comprises an annular body 6 of friction facing and a plurality of plate-like sections 7 embedded into a rear surface 8 of that facing body 6. An example form of that type of construction is shown in FIGS. 4 to 6 of the drawings. That and other examples shown by the accompanying drawings are related to clutch plate use, whereas in other applications of the invention the component need not be annular and a single metal section may be embedded in the facing body rather than having a plurality of such sections as shown.

Each section 7 is preferably formed of sheet metal and is of such a size as to extend across a relatively small part of the surface 8. In that regard the function of each metal section 7 is to provide a carrier for at least one fastener 4, which in the example shown is in the form of a rivet, and in particular provides such a carrier which requires minimum intrusion of either it or the associated fastener 4 into the body 6 of the friction facing. In the example of FIGS. 4 to 6 a plurality of integral rivets 4 is provided on each section 7, but in other situations there may be a single rivet only. Again in the particular example shown, adjacent sections 7 are interconnected by an integral narrow band 9 so that all sections 7 form part of a single unit, which will be hereinafter referred to as a skeleton 10. The skeleton 10 is embedded in the rear surface 8 of the facing body 6 as best shown in FIGS. 5 and 6.

It is significant that the skeleton 10 is embedded within the rear surface 8 of the facing body 6 and in that regard it is preferred that the exposed face 11 of each section 7 is substantially co-planar with the surface 8. That co-planar arrangement allows the cushion segments 3 to engage the rear surface 8 of the facing body 6 outside the perimeter of the section 7 and thereby increase the area of the facing body 6 which can be directly supported by the cushion segments 3 during use. Embedding the skeleton 10 has the further advantage of resisting separation of the skeleton 10 and the facing body 6 under torque loading.

The skeleton 10 can be secured to the facing body 6 in any appropriate fashion. For example, the body 6 may be moulded over the skeleton 10 so that bonding of the body 6 and skeleton 10 is achieved simultaneous with moulding. The skeleton 10 may be pretreated to improve the bond between it and the body 6, whether or not that bond is achieved simultaneous with moulding of the body 6. For example, the skeleton 10 may be subjected to a phosphating process, or it may be provided with an adhesive coating by spraying or other appropriate technique.

As shown in FIG. 4 the connecting bands 9 are arranged adjacent the inner periphery 12 of the facing body 6. It is preferred that each band 9 is substantially straight so as to extend generally in the direction of a tangent to the periphery 12.

A skeleton 10 of the general kind shown by FIG. 4 can be formed in any appropriate manner. For example, it may be pressed, stamped, or cut from sheet metal stock. Alternatively, it may be formed from a substantially straight strip of metal which is bent into a circular form as shown in FIG. 4. FIG. 7 shows in diagrammatic form a method of the latter kind. In that method, a straight strip 13 of metal is fed into a press tool 14 which, in the example shown, serves to stamp or press sections from the strip 13 so as to form the sections 7 and interconnecting bands 9. For that purpose, passage through the press tool 14 will be on an intermittent basis. The tool 14 may also serve to form the integral rivets 4 and clearance holes 15 in each section 7.

The resulting formed strip 16 is then introduced into winding and shear mechanism 17 which serves to bend the formed strip 16 into the circular form previously mentioned. When that bending or winding operation has advanced to the stage shown in FIG. 7, the mechanism 17 operates to separate, by a cutting action for example, the resulting circular or annular skeleton 10 from the remainder of the strip 16. Such separation occurs along the line 18 as shown in FIG. 7.

FIGS. 8 to 10 show the skeleton 10 as it is formed by the mechanism 17. If desired, the opposed ends 19 and 20 of that skeleton 10 can be secured against separation by welding or other appropriate means.

In the particular arrangement shown by FIGS. 7 to 10, the tool 14 removes a central portion of each section 7 so as to produce an opening 21 and that serves to reduce the material content and consequently the weight of the resulting skeleton 10.

Obviously, methods other than that described in connection with FIG. 7 may be adopted to form a skeleton 10 as shown in FIGS. 8 to 10.

Figure 11:
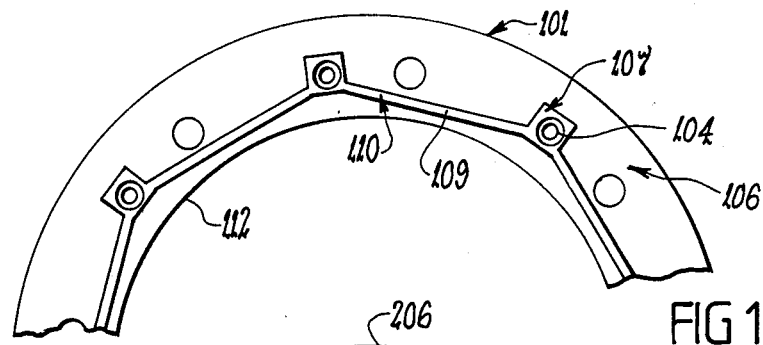
FIG. 11 is a partial view of another form of friction component made in accordance with the present invention.

Furthermore, the skeleton may take many different forms and one alternative to the FIG. 4 arrangement is shown in FIG. 11. Components of the FIG. 11 construction which correspond to those of the FIG. 4 construction are given like reference numerals except that they form part of the number series 100 to 199. As with FIG. 4, the skeleton 110 is embedded in the facing body 106.

Figure 12:
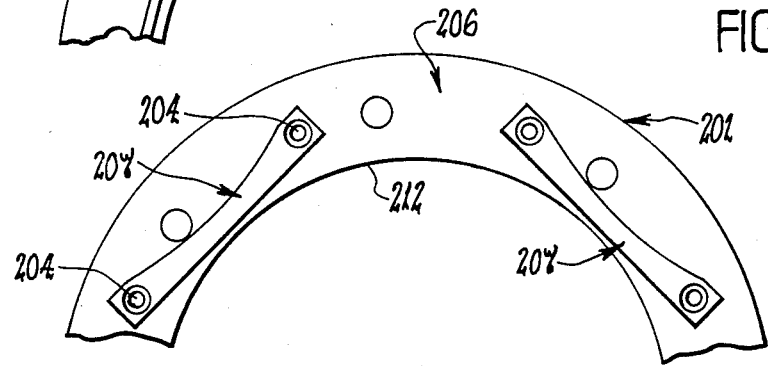
FIG. 12 is a view similar to FIG. 11 but showing yet another embodiment.
Figure 13:
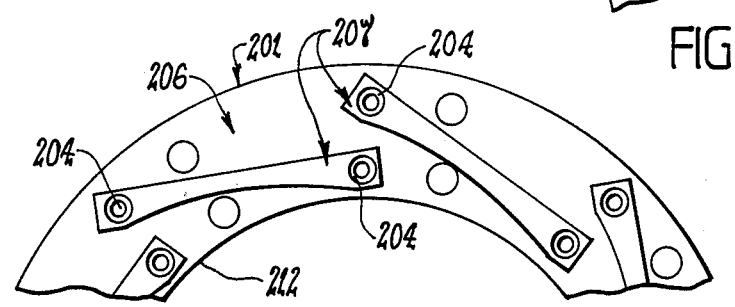
FIG. 13 is a view similar to FIG. 11 but showing still another embodiment.
Figure 14:
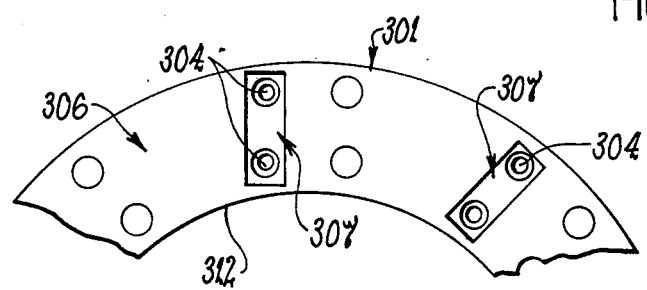
FIG. 14 is a view of yet another embodiment.

FIGS. 12 and 13 show arrangements in which the metal sections are formed as individual components rather than being interconnected as in the FIG. 4 and 11 arrangements. In each case components corresponding to those of FIG. 4 are given like reference numerals except that they form part of the number series 200 to 299. FIG. 14 shows still another arrangement in which components are identified by numbers in the series 300 to 399. In each of the arrangements of FIGS. 12 to 14 the metal sections 207 or 307 are embedded in the facing body 206 or 306 respectively as in the case of the FIG. 4 arrangement.

It will be apparent that many other variations are possible and that FIGS. 11 to 14 merely illustrate a few of the available alternatives. Furthermore, as previously stated, the examples shown in the drawings relate to clutch plates and other forms of the invention may be more appropriate in other applications of the invention such as friction components for brakes.

A friction component in accordance with the present invention has several important advantages over the prior art. One advantage is that the friction facing can be made thinner than in the case of prior constructions while having the same depth of usable material. Such a reduction in thickness reduces the cost of the component and also reduces its inertia. When the invention is applied to clutch plates, the latter aspect can reduce wear in associated transmission components. Furthermore, the use of integral rivets adds to the convenience of connecting the friction component into an assembly. It is also possible to accurately locate the or each metal section relative to the friction facing, particularly when that facing is moulded directly over the metal section while that section is located in the moulding die. That improves the balance of the component with consequent improvement in overall performance.

Other advantages will be apparent from the foregoing detailed description.

Various alterations, modifications and/or additions may be introduced into the constructions and arrangements of parts previously described without departing from the spirit or ambit of the invention as defined by the appended claims.

Having now described my invention what I claim as new and desire to secure by Letters Patent is:

1. A friction component including, a facing of friction material, at least one metal section of plate-like form secured to said facing so as to be held against movement relative thereto, said metal section being embedded within a rear surface of said friction facing so as to be exposed at that rear surface and so that the periphery of the metal section is completely surrounded by said friction facing, and at least one hollow fastener formed integral with said metal section and projecting therefrom outwardly away from said rear surface, said fastener providing means whereby said friction component can be attached to a clutch plate cushioning spring.

2. A friction component according to claim 1, wherein said section extends across a small part of the area of said rear surface.

3. A friction component according to claim 1, wherein said facing is an annular section of friction material.

4. A friction component according to claim 1, wherein a plurality of said plate-like sections are provided on said facing in spaced relationship.

5. A friction component according to claim 4, wherein adjacent said plate-like sections are interconnected to form a single member.

6. A friction component according to claim 5, wherein said interconnection comprises an integral relatively narrow metal band.

7. A friction component according to claim 6, wherein said facing is an annular section of friction material, said plate-like sections are arranged in circumferentially spaced relationship around said annular section, and each said band extends in a substantially straight path between the said adjacent plate-like sections and is located adjacent the inner periphery of said annular section.

8. A friction component according to claim 6, wherein said interconnected plate-like sections are arranged in a circle in circumferentially spaced relationship and project laterally outward from one side of said bands, whereby said plate-like sections and said bands cooperate to form a substantially annular skeleton in which said bands form part of the inner periphery.

9. A friction component according to claim 1, wherein said plate-like section is secured to said facing by adhesive.

10. A friction component according to claim 1, wherein said fastener is a rivet-type fastener.

11. A friction component according to claim 1, wherein the face of said plate-like section which is exposed at the rear surface of said facing is substantially co-planar with said rear surface.

12. A friction component according to claim 1, wherein said facing is moulded about said plate-like section.

13. A friction component according to claim 1, wherein said metal section is a phosphated metal section.

14. A friction component according to claim 1, wherein said fastener is closed at its outer end.

15. A clutch plate assembly including a friction component according to claim 3.

* * * * *